United States Patent [19]

Johl

[11] Patent Number: 4,522,047
[45] Date of Patent: Jun. 11, 1985

[54] DOCUMENT CASE

[75] Inventor: Armin Johl, Obertshausen, Fed. Rep. of Germany

[73] Assignee: Karl Seeger Lederwarenfabrik GmbH, Fed. Rep. of Germany

[21] Appl. No.: 440,823

[22] Filed: Nov. 12, 1982

[30] Foreign Application Priority Data

Dec. 15, 1981 [DE] Fed. Rep. of Germany ... 8136526[U]

[51] Int. Cl.$^3$ .................. E05B 65/52; E05B 47/00
[52] U.S. Cl. .................................. 70/69; 70/278
[58] Field of Search .................... 70/67–76, 70/277, 278, 279; 235/380

[56] References Cited

U.S. PATENT DOCUMENTS 4,236,068 11/1980 Walton .......................... 235/380
4,426,862 1/1984 Yamada .............................. 70/69

Primary Examiner—Robert L. Wolfe
Attorney, Agent, or Firm—Allegretti, Newitt, Witcoff & McAndrews Ltd.

[57] ABSTRACT

An attache case having an electronically-controlled, electric combination lock assembly comprising a keyboard mounted flush with the external surface of the case, programming switches for selecting the combination for the lock mounted inside the case and a solar cell unit mounted flush with the external surface of the case for supplying energy for actuating the electronic controls and the lock mechanism. The keyboard and solar cells are mounted on either side of the case handle and are secured to internal reinforcing frame members of the case.

7 Claims, 3 Drawing Figures

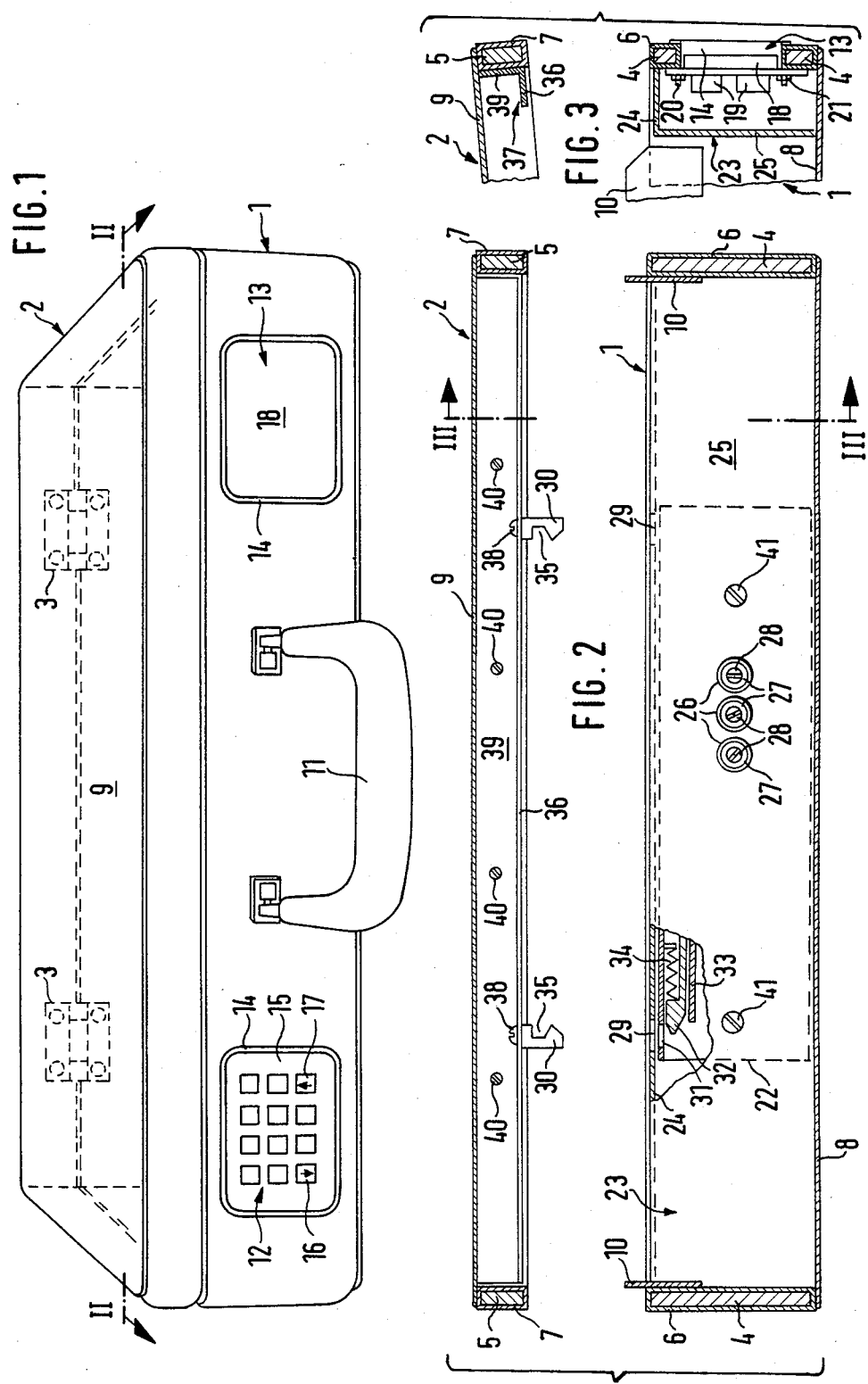

DOCUMENT CASE

This invention relates to a case, especially a leather attache case, comprising a rectangular box and a corresponding lid, each having an integral reinforcing frame extending around all four sides. The lid is connected to the box along one longitudinal side by hinges fixed to both reinforcing frames and, at the opposite longitudinal side, to which a carrying handle is fixed, the lid and the box are locked together or unlocked by a combination lock assembly fixed partly to the reinforcing frame of the box and partly to the reinforcing frame of the lid. The combination lock assembly comprises, in addition to the locking elements, actuators mounted inside the case and numerical selector elements for a numerical combination mounted on the outside of the case.

Documents cases of this type are equipped according to the state of the art with numerical combination locks, the adjustable number combination of which can be set by digital selector wheels mounted on the outside of the case within fitting plates. When the digital selector wheels are set to a digital sequence previously adjusted by means of actuating levers mounted internally on the lock casings, the lock can be opened by operating knobs mounted displaceably on the fitting plates. The combination locks and their externally situated fitting plates are mounted on the box, whereas the spring-biased clasp levers, which are associated with the fitting plates, are pivotally fixed to the outside of the lid.

To open a case of this type, which usually is equipped with two combination locks each having three digital selector wheels, the selector wheels must first be set to the predetermined numerical combination on each lock, whereupon the operating knob at each lock must be displaced in order to unlock the clasp lever. Several successive operating steps are therefore necessary before the case is opened. During the closing of the case the reverse sequence must be adopted. The clasp levers are pivoted in and engaged with the fitting plates of the combination locks as the lid is closed, whereupon at each numerical combination lock at least one of the digit selector wheels must be set in order to block the operating knobs and thus the bolts of the lock. Consequently, in order both to open and to close the case, a series of operating steps has to be carried through on each occasion. These operating steps cannot always be carried out unobtrusively. The externally disposed fitting plates of the combination locks and especially their projecting clasp levers in the opened state interfere with the desired smooth appearance of such document cases.

The object of the present invention is to provide a document case provided with a simply, rapidly and unobtrusively-operated combination lock assembly, which has no parts projecting from the surface of the case.

The object is achieved according to the present invention by providing, in combination with the case, and electronically-controlled electrical lock, the digital selector elements of which are constructed as a keyboard and their actuating elements as programming switches. The electrical supply to the electric lock comprises a solar cell unit disposed on the outer side of the case, connected to a dry accumulator (rechargeable storage battery) mounted inside the case.

This lock assembly is operated by a single, easily-understood keyboard which does not project above the surface of the case, whereby opening and closing operations are significantly simplified and speeded up. Furthermore, depressing a key can be carried out much less obtrusively than rotating digital selector wheels which, because of their small size, are difficult to see except at close range. The energy supply for the electronically controlled electric lock is provided exclusively by the solar cell unit fitted unobtrusively to the outside of the case, and which for this purpose can be mounted on any wall of the case which is normally well illuminated. In addition, a plurality of solar cell units connected in common with the dry accumulator can also be provided at different positions on the case. Suitable dry accumulators are nickel-cadmium storage batteries, which can be connected directly to the rear face of the solar cells and form one unit with them. Since the electronic equipment of the electrical lock inevitably occupies a small space on account of the miniaturization of the electronic components, the combination lock assembly, together with all its components, can be unobtrusively mounted in the case. The numerical combination can be simply and rapidly set and, if desired, changed by means of programming switches which are accessible from the interior of the case.

Preferably, the keyboard possesses a number of keys corresponding to the digits 0 to 9 and, additionally, an opening key and a closing key. With nine digit keys and a three-position number combination, 7,920 number combinations are possible, which is completely satisfactory for a case lock. By the provision of one special key each for closing and opening the case within the keyboard, operation is made extremely simple. With a three-digit number combination, three programming switches adjacent to one another are appropriate.

In the preferred form of embodiment of the case, a window opening is provided on either side of the carrying handle, one of these openings seating the keyboard and the other the solar cell unit. The only two parts of the electrical lock assembly which are visible from outside, namely the keyboard and the solar cell unit, are in this way provided in a harmonious arrangement on either side of the carrying handle, the window openings each being spaced the same distance from the centrally-disposed handle. The window openings are formed in the reinforcing frame of the box, are of matching rectangular shape and are each framed by a metal frame. Each frame bears against the box from the outside, extends through the window opening and is detachably connected on the inner side of the box with the keyboard and solar cell unit respectively. In this manner the keyboard and the solar cell unit can be easily and reliably attached to the reinforcing frame of the box. The metal frame in each case frames the window openings, forming an external closure and at the same time fitting over the covering material of the frame, preferably high-quality leather. The window openings need not be rectangular, although this shape, on account of the row arrangement of the keys in the keyboard, is especially suitable for the window opening for the keyboard. Other geometrical window opening forms can, however, be considered, for example circular or triangular openings.

In the interest of a space-saving and unobtrusive housing of the components, according to the present invention, the parts of the electronically-controlled electrical lock are fixed to the inner surface of the reinforcing frame component of the box to which the carrying handle is connected. These parts are covered over by a removable right-angle strip, continuous from one wall of the box to the other, which strip possesses, in its narrower flange facing towards the opening of the chest, apertures for locking pins fixed to the lid and, in its wider flange extending the full depth of the box, apertures for the programming switches. The fixing of the locking pins to the lid can be effected in an equally space-saving and unobtrusive manner by mounting them on a sheet metal profile fixed to the reinforcing frame and extending from one end wall to the other.

Further details of this invention are explained in more detail below with reference to drawings illustrating one embodiment thereof. In the drawings:

FIG. 1 is a perspective overall view of the case,
FIG. 2 is a sectional view along II—II of FIG. 1, but with the lid slightly raised, and
FIG. 3 is a cut-away side view along III—III of FIG. 2.

The document case illustrated in the drawings consists of a rectangular box 1 and of a correspondingly formed lid 2, fitting onto the box. Box 1 and lid 2 are connected together in articulated manner by hinges 3. Stiffness is provided to the box and the lid by reinforcing frames 4,5 respectively extending around all four sides. The reinforcing frames 4 and 5, made for example of plywood, each have a covering 6,7 respectively, of, for instance, leather. The principal wall 8 of the box 1 is a multi-layer flexible wall formed at least externally of leather and is fixed in a manner not shown to the covered reinforcing frame 4. The principal wall 9 of the lid 2 is formed in corresponding manner and secured to the reinforcing frame 5. At the end walls of the reinforcing frame 4 there are internal gap cover plates 10, the purpose of which is to engage the reinforcing frame 5 when the case is closed.

On the front longitudinal side of the case as seen in FIG. 1, the carrying handle 11 is fixed to the reinforcing frame 5. On either side of the carrying handle 11, window openings 12 and 13 are provided in the box 1, these openings passing through the reinforcing frame 4, as illustrated in FIG. 3 by the example of the window opening 13. The window openings 12 and 13 are each framed by a metal frame 14, which has an external flanged rim bearing against the covering 6 and a perpendicular component, or skirt, extending through the window opening. As can be seen from FIG. 3, the rim and skirt of the metal frame 14 as viewed in cross-section are angle members. A metal frame of this type can be easily produced by deep-drawing.

Inside the window opening 12 is the keyboard 15, with number keys "9" to "0", a closure key 16 and an opening key 17. The total of 12 keys is arranged in three horizontal rows. The closure key 16, or indeed the opening key 17, may possess a double function, assuring on the one hand the closing or opening of the combination lock assembly and on the other hand the switching on of the electronic device in order to activate the digit keys for the inputting of the digital combination. The electronic equipment, not shown, may be of the type in which this activation is automatically cancelled again after a certain short period of time if, after the key 16 or 17 has been actuated, there is no input of the digital combination. After inputting of the digital combination, the lock can be opened by actuating the opening key 17, whereupon the lid 2 can be raised. Conversely, after closure of the lid 2 and actuation of the closure key 16, the lock is again locked.

The solar cell unit 18 is mounted in the other window opening 13. The dry accumulator, consisting for example of a plurality of Ni-Cd batteries, is mounted on the rear side of cell unit 18, as shown in FIG. 3. Also apparent from FIG. 3, the solar cell unit 18 is fixed to threaded projections 20 of the metal frame 14 by means of nuts 21. The keyboard 15 is fixed in a corresponding manner.

The electronically-controlled electric lock 22, of known construction, is illustrated in FIG. 2 only in the outline of its casing. The electronic lock 22 is fixed, for example, by gluing and/or screwing, to the inner face of the frame member of the reinforcing frame 4 which also carries the keyboard 15 and the solar cell unit 18. The electronic lock 22 and associated keyboard 15, and the solar cell unit 18 with the dry accumulator 19, are covered on the inside by a removable L-shaped plate 23, which extends from side wall to side wall of the box 1, as can be seen from FIG. 2. The angle plate 23 adjoins, with its upper, narrower flange 24, the forward wall of the box, as can be seen from FIG. 3. Its wider flange 25 extends over the internal depth of the box. Apertures 26 are provided in flange 25 for the programming switches of the electric lock 22. The programming switches, mounted with their external face in the plane of the flange 25, comprise a stationary digit ring 27 and a rotatable switch core 38, slit to receive a screwdriver tip. The digits of the keyboard 15 (not shown) are marked around the circumference of digit rings 27. In the narrow flange 24 of the angle plate 23 apertures 29 are provided, spaced one from another, for the passage of the locking pins 30, fixed to the lid 2 in a manner described below. The apertures 29 are aligned with locking openings 31 of the electric lock 22, one of which is shown in the broken-away portion of FIG. 2. Below each locking opening 31 a bolt 32 is disposed longitudinally slidable inside a guide 33 of the electric lock 22, which bolt is biased to locked position by a stationarily supported compression spring 34. A stop, not shown, limits the distance the bolt can move. When the locking pin 30 enters the locking opening 31, the bolt 32 engages a locking notch 35 of the locking pin. By the arrangement of the complementary inclined surfaces illustrated in the drawing, this engagement can be released when the electric lock 22 is opened by application of slight force as the lid 2 is opened, the bolt 32 deflecting temporarily against the pressure of the spring 34, before it again advances to the position shown in FIG. 2.

The locking pins 30 are fixed, for example, by screws 38, to flange 36 of an angle profile 37 facing towards the flange 24 of the angle plate 23. The angle plate profile 37 also extends from one side wall to the other of the lid, and is fixed by its flange 39 to the reinforcing frame 5 by means of screws 40. The fixing of the angle plate 23 in the box 1 can be effected by means of screws 41, which are screwed into the casing of the electric lock 22.

Since the angle plate 23 and the angle plate profile each extend from side wall to side wall of the box 1 and lid 2 respectively, they do not adversely affect the appearance, especially if they are adapted in their color to the color of the lining of the case. Angle plate 23 and angle plate profile 37 can, as stated, be bent from metal sheet, but the use of extruded profiles of aluminum or plastics is also possible.

I claim:
1. A document case having a concealed locking mechanism comprising a rectangular box and a lid hinged to the box, each having a reinforcing frame extending around all four sides, a handle fixed to the box, an electronically-controlled combination lock assembly having lock elements fixed to the inside of the reinforcing frame of the lid, and cooperating elements fixed to the inside of the reinforcing frame of the box, and a pair of windows in the reinforcing frame of said box, adjacent said handle, one of said windows having a keyboard seated within its periphery, substantially flush with the external surface of said box, said keyboard having digital selector elements connected to programming switches inside said box for controlling the opening and closing of the cooperating elements of said lock assembly, the other of said windows having a battery-charging solar cell unit seated within its periphery, substantially flush with the external surface of said box, said solar cell unit being connected to a storage battery inside said case to provide power for energizing both said cooperating elements and the electronic controls therefor.

2. The case of claim 1 in which said keyboard has a number of keys corresponding to the digits 0 to 9 and additionally an opening key and a closing key.

3. The case of claim 2 in which said lock has a three-position numerical combination and three programming switches disposed alongside one another.

4. The case of claim 1 in which said windows are of the same rectangular shape and are each framed by a metal frame which bears externally against the box, extends through the window opening and is releasably connected on the inner face of the box.

5. The case according to claim 1 characterized in that the components of the electronically controlled electric lock are all fixed to the inner face of the reinforcing frame component of the box and are covered by a removable angle plate extending continuously from one side wall of the box to the other, which plate contains in its narrower flange facing towards the opening of the case, apertures for said locking elements fixed to the lid and, in its wider flange extending over the depth of the box interior, apertures for said programming switches.

6. The case according to claim 5, characterized in that the locking elements of the lid are secured to a sheet metal profile extending in the interior of the lid from one end wall to the other, and said profile is fixed to the reinforcing frame.

7. The case of claim 1 in which said handle is centrally located on one side of said box and said windows are located one on either side of said handle.

* * * * *